United States Patent
Kokubo et al.

(10) Patent No.: US 8,118,342 B2
(45) Date of Patent: Feb. 21, 2012

(54) LOCK APPARATUS OF SEAT FOR VEHICLE

(75) Inventors: Motohiro Kokubo, Kariya (JP); Ikuno Nakanishi, Kariya (JP); Kouji Kondoh, Toyota (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 351 days.

(21) Appl. No.: 12/413,698

(22) Filed: Mar. 30, 2009

(65) Prior Publication Data

US 2009/0295186 A1 Dec. 3, 2009

(30) Foreign Application Priority Data

May 29, 2008 (JP) .................................. 2008-140661

(51) Int. Cl.
*B60N 2/20* (2006.01)
(52) U.S. Cl. ................. 296/65.16; 297/378.13
(58) Field of Classification Search ............... 296/65.16, 296/65.17; 297/378.13
See application file for complete search history.

(56) References Cited

U.S. PATENT DOCUMENTS

| | | | |
|---|---|---|---|
| 4,765,682 A | | 8/1988 | Satoh |
| 5,338,996 A * | | 8/1994 | Yamamoto ............. 310/216.048 |
| 5,566,431 A * | | 10/1996 | Haglund ......................... 24/633 |
| 6,733,078 B1 * | | 5/2004 | Zelmanov ................. 297/378.1 |
| 7,044,552 B2 * | | 5/2006 | Muller et al. ................. 297/336 |
| 7,152,926 B2 * | | 12/2006 | Wrobel ..................... 297/378.13 |
| 7,188,906 B2 * | | 3/2007 | Christoffel et al. ....... 297/378.13 |
| 7,410,217 B2 * | | 8/2008 | Inoue et al. .............. 297/378.13 |
| 7,494,187 B2 * | | 2/2009 | Inoue et al. .............. 297/378.13 |
| 7,578,558 B2 * | | 8/2009 | Tanaka ..................... 297/378.13 |
| 7,740,317 B2 * | | 6/2010 | Yamada et al. .......... 297/378.13 |
| 2007/0200411 A1 | | 8/2007 | Inoue et al. |
| 2008/0296951 A1 * | | 12/2008 | Goshima et al. ......... 297/378.13 |

FOREIGN PATENT DOCUMENTS

| | | |
|---|---|---|
| EP | 1 810 871 A2 | 7/2007 |
| EP | 1 810 871 A3 | 7/2007 |
| JP | 06171414 A * | 6/1994 |
| JP | 2006-248330 | 9/2006 |

* cited by examiner

*Primary Examiner* — Glenn Dayoan
*Assistant Examiner* — Paul Chenevert
(74) *Attorney, Agent, or Firm* — Oblon, Spivak, McClelland, Maier & Neustadt, L.L.P.

(57) ABSTRACT

A lock apparatus of a seat for a vehicle includes a striker, a first plate including a first plate groove portion, a second plate including a second plate groove portion, plural fixing portions provided at the first and second plates, a hook member being pivotable between a lock release position and a lock position and including a hook groove portion with and from which the striker is engageable and releasable, a pawl member engageable with and releasable from the hook member, a biasing member biasing the hook member and the pawl member, and plural connecting portions provided at the first and second plates for connecting the first and second plates. The connecting portions are located at an area defined between the fixing portions and one side portion of the first and second plates opposite to another side portion at which the first and second plate groove portions are formed.

7 Claims, 6 Drawing Sheets

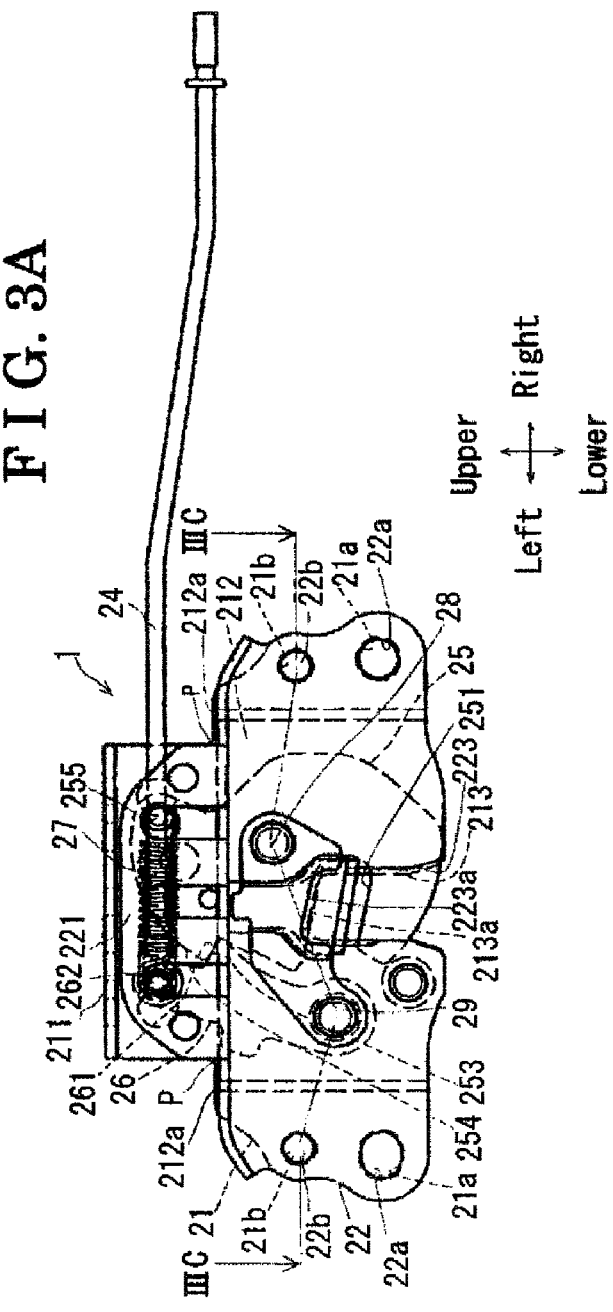
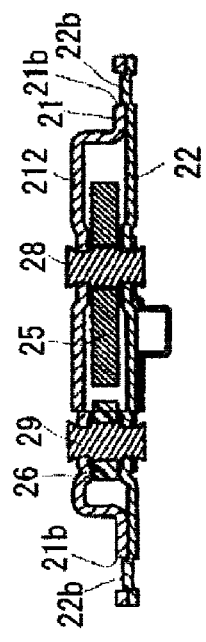
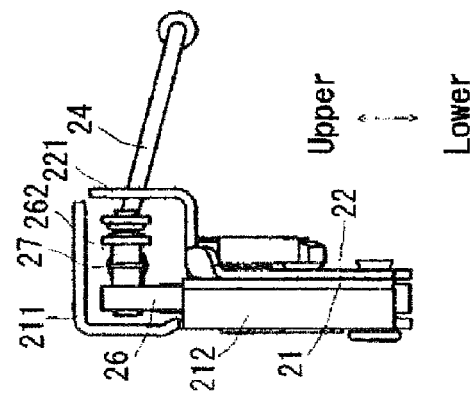

LOCK APPARATUS OF SEAT FOR VEHICLE

CROSS REFERENCE TO RELATED APPLICATIONS

This application is based on and claims priority under 35 U.S.C. §119 to Japanese Patent Application 2008-140661, filed on May 29, 2008.

FIELD OF THE INVENTION

The present invention generally relates to a lock apparatus of a seat for a vehicle.

BACKGROUND

According to a known seat for a vehicle, a seatback portion of a backseat is tilted (retractable type), and/or is detachable from a vehicle floor (detachable type), so as to reduce a surface level difference on the vehicle floor inside the vehicle, thus enabling an effective use of a space inside the vehicle. Such retractable type seat may be fixed at a side surface of the vehicle compartment, and such detachable type seat may be fixed at the vehicle floor, for example, through a lock apparatus. As an example of such seat apparatus, JP2006-248330A (hereinafter, referred to as reference 1) discloses a seat lock assembly (lock apparatus), which is provided at a side surface of a vehicle compartment and at a side surface of a seatback for fixing (locking) the seatback to the side surface of the vehicle compartment. The seat lock assembly includes a striker, a base plate (first plate), a back plate (second plate), a latch (hook member) and a ratchet (pawl member).

According to the reference 1, the striker is fixedly connected to the side surface of the vehicle compartment. The base plate and the back plate are arranged to overlap each other and are connected to the side surface of the seatback so that the base plate faces the side surface of the seatback. Further, the base plate and the back plate include striker grooves, respectively, into which the striker is inserted. A hook member is pivotably provided between the base plate and the back plate and is biased in a lock release direction by a spring. The hook member includes an engagement groove, with which the striker inserted into the striker grooves of the base plate and the back plate is engaged. A pawl member is pivotably provided between the base plate and the back plate so as to suppress a pivotal movement of the hook member in a lock direction.

Due to such lock apparatus, when the striker is interposed by inner end walls of the striker grooves of the base plate and the back plate and side surfaces of the engagement groove formed at the hook member, the seatback is locked to the side surface of the vehicle compartment (hereinafter, such condition is referred to as a locked state). When an external force is applied to the striker in a direction to release the striker from the striker grooves of the base plate and the back plate in the locked state, the pawl member makes contact with the hook member to suppress a pivotal movement of the hook member for preventing the hook member from pivoting by a biasing force of the spring to be in a lock released state.

The striker groove is formed at each of the base plate and the back plate so as to extend from a central portion of a side surface of the corresponding plates. Further, attachment holes (attachment portions) are formed at both sides of each striker groove so that the base plate and the back plate are attached to the side surface of the seatback. Accordingly, when the external force is applied to the striker in a direction to release the striker from the striker grooves, a reacting force is generated at the attachment holes (attachment portions) provided at each of the base plate and the back plate, and the base plate and the back plate are forced to strain in a direction where an opening portion of the groove portion expands. Further, a bent portion may be formed at the base plate for housing the latch and the ratchet. In such a condition, the rigidity of the base plate is reduced to be lower than the rigidity of the back plate. Accordingly, when the base plate includes a shape-changing portion from which a cross sectional shape and/or a cross sectional area of the base plate changes, the reacting force is intensively generated at the shape-changing portion, and the base plate may accordingly be deformed and/or damaged.

A need thus exists for a lock apparatus of a seat for a vehicle, which is not susceptible to the drawback mentioned above.

SUMMARY OF THE INVENTION

According to an aspect of the present invention, a lock apparatus of a seat for a vehicle includes a striker, a first plate, a second plate, a plurality of fixing portions, a hook member, a pawl member, a biasing member and a plurality of connecting portions. The striker is adapted to be fixedly connected to one of a fixture member and a movable member. The first plate is adapted to be fixedly connected to the other of the fixture member and the movable member. Further, the first plate includes a bent portion and a first plate groove portion with and from which the striker is engageable and releasable. The second plate is provided to overlap the first plate with a space from the bent portion of the first plate and adapted to be fixedly connected to the other of the fixture member and the movable member. Further, the second plate includes a second plate groove portion with and from which the striker is engageable and releasable. The second plate groove portion of the second plate is provided at a position corresponding to the first plate groove portion of the first plate. The fixing portions are provided at the first and second plates for fixedly connecting the first and second plates to the other of the fixture member and the movable member. The hook member is provided in the space defined between the first plate and the second plate and pivotably supported by the first and second plates via a hook pivot shaft. Further, the hook member includes a hook groove portion with which the striker is engageable when the striker is engaged with the first and second plate groove portions and from which the striker is releasable when the striker is to be released from the first and second plate groove portions. The hook member is pivotable between a lock release position, at which the striker is fully released from the hook groove portion, and a lock position, at which the striker is engaged with the hook groove portion and is prevented from being released therefrom. The pawl member is provided in the space defined between the first plate and the second plate and pivotably supported by the first and second plates via a pawl pivot shaft. Further, the pawl member is adapted to be engaged with a first engagement surface of the hook member for preventing the hook member from pivotally moving from the lock position towards the lock release position when the hook member is located at the lock position. Further, the pawl member is adapted to be released from the first engagement surface of the hook member and to be engaged with a second engagement surface of the hook member for allowing the hook member to pivotally move from the lock position towards the lock release position. The biasing member is provided in the space defined between the first and second plates and biases the hook member and the pawl member in a direction to engage the hook member and the pawl member. The connecting portions are provided at the first and second plates for connecting the first and second plates with each other. The connecting portions are located at an area defined between the fixing portions and one side portion of the first and second plates, the one side portion opposite to another side portion at which the first and second plate groove portions are formed.

BRIEF DESCRIPTION OF THE DRAWINGS

The foregoing and additional features and characteristics of the present invention will become more apparent from the following detailed description considered with reference to the accompanying drawings, wherein:

FIG. 3A is a plane view illustrating the lock apparatus of the seat for the vehicle according to the embodiment;

FIG. 3B is a side view of FIG. 3A;

FIG. 3C is a cross sectional view taken along line IIIC-IIIC in FIG. 3A;

DETAILED DESCRIPTION

An embodiment of the present invention will be described hereinbelow with reference to the attached drawings. According to the embodiment, a seat lock apparatus (hereinafter referred to as lock apparatus) 1 is adapted to be mounted on a seat 10, which is disposed at a backside portion in a vehicle compartment as an example. Hereinafter, directions of the lock apparatus 1, such as "front and rear (longitudinal)", "left and right (lateral)", "upper and lower (vertical)", and the like, correspond to an orientation indicated with arrows illustrated in FIGS. 2 and 3.

Figure 1:
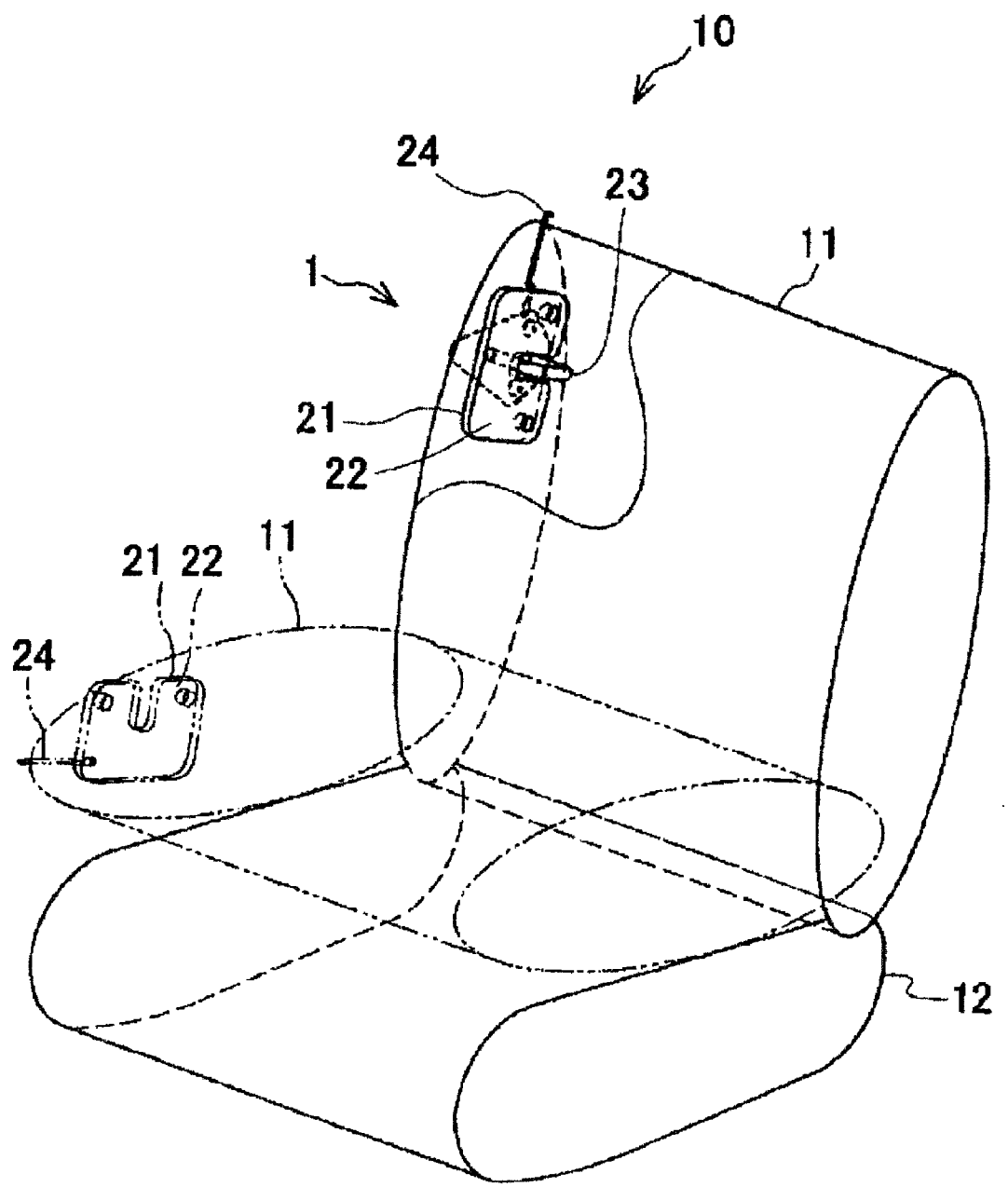
FIG. 1 is a perspective view illustrating a lock apparatus of a seat, which is assembled onto a seat (backside seat) for a vehicle, according to an embodiment.

As illustrated in FIG. 1, the lock apparatus 1 includes a main base plate (serving as a first plate) 21 and a sub base plate (serving as a second plate) 22. The main base plate 21 and the sub base plate 22 are arranged to overlap each other and are adapted to be fixedly connected to a side surface of a seatback (serving as a movable member) 11 of the seat 10 so that the main base plate 21 faces the side surface of the seatback 11. A striker 23 is fixedly connected to a side surface of a vehicle compartment (serving as a fixture member) at a position corresponding to the main base plate 21 (the sub base plate 22) in a state where the seatback 11 is in an upright position (standing position). With reference to FIG. 1, a condition where the seatback 11 is fixed to the side surface of the vehicle compartment as illustrated by a continuous line indicates a locked state of the lock apparatus 1. The locked state of the lock apparatus 1 is released for example by pressing a lever 24 which is assembled to the main base plate 21 and the sub base plate 22, thus tilting the seatback 11 of the seat 10 towards a seat cushion 12. With reference to FIG. 1, the tilted seatback 11, the main base plate 21 and the sub base plate 22 connected to the seatback 11, and the lever 24 connected to the seatback 11 (i.e., a lock released state of the lock apparatus 1) are indicated by dotted lines.

Figure 2:
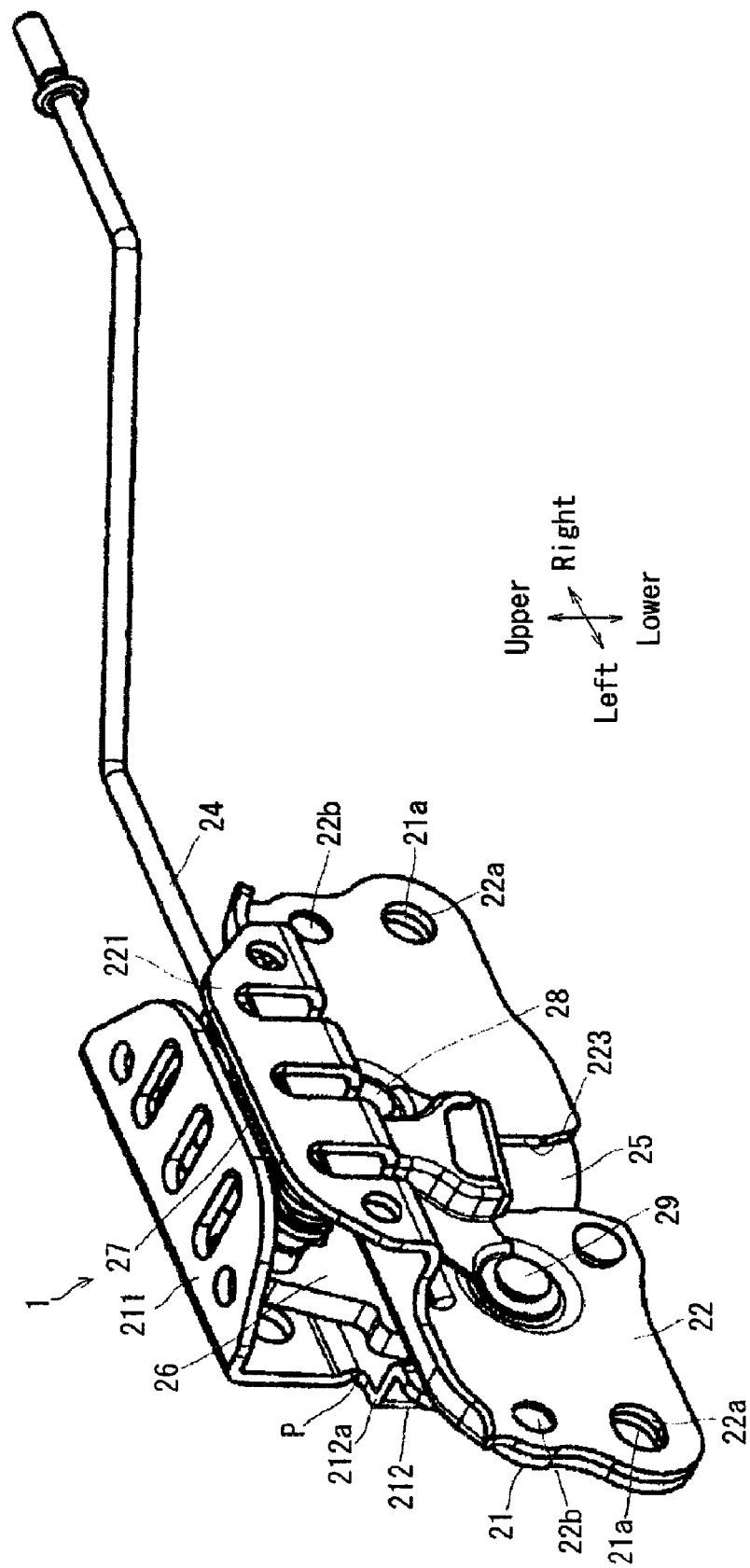
FIG. 2 is a perspective view illustrating the lock apparatus of the seat for the vehicle.

As illustrated in FIGS. 2 and 3, a hook (serving as a hook member) 25 and a pawl (serving as a pawl member) 26 are housed in a space defined between the main base plate 21 and the sub base plate 22. The hook 25 and the pawl 26 are pivotably supported by the main base plate 21 and the sub base plate 22. Further, a tension spring (serving as a biasing member) 27 is also housed in the space defined between the main base plate 21 and the sub base plate 22. A first end of the tension spring 27 is connected to the hook 25, while a second end of the tension spring 27 is connected to the pawl 26, thereby biasing the hook 25 and the pawl 26 in a direction to engage the hook 25 and the pawl 26.

An external shape of the main base plate 21 and that of the sub base plate 22 are formed to be approximately the same. However, an approximately central portion of the main base plate 21 is bent to have a U-shaped cross section as illustrated in FIG. 3C, while an entirety of the sub base plate 22 is formed to be an approximately plane shape. Accordingly, in a structure where the main base plate 21 and the sub base plate 22 are arranged to overlap each other, a space is defined between a bent portion 212 of the main base plate 21 and an approximately central portion of the sub base plate 22, while left and right side portions of the main base plate 21 and left and right side portions of the sub base plate 22 are arranged to closely contact each other, respectively. The hook 25 and the pawl 26 are housed in the space defined between the bent portion 212 of the main base plate 21 and the approximately central portion of the sub base plate 22. Further, plural attachment holes (serving as a plurality of first attachment holes) 21a are formed through the main base plate 21, while plural attachment holes (serving as a plurality of second attachment holes) 22a are formed through the sub base plate 22 at positions respectively corresponding to the attachment holes 21a. The attachment holes 21a of the main base plate 21 and the attachment holes 22a of the sub base plate 22 serve as a plurality of fixing portions, through which the main base plate 21 and the sub base plate 22 are fixedly connected to the side surface of the seatback 11. According to the embodiment, two attachment holes (serving as first and second fixing portions) 21a, for example, are formed at lower portions of the left and right side portions of the main base plate 21 (contacting portions where the main base plate 21 and the sub base plate 22 are arranged to closely contact each other), respectively. Further, two attachment holes (serving as the first and second fixing portions) 22a, for example, are formed at lower portions of the left and right side portions of the sub base plate 22 (the contacting portions where the main base plate 21 and the sub base plate 22 are arranged to closely contact each other), respectively. Further, fitting holes 21b and fitting protrusions 22b are provided at the main base plate 21 and the sub base plate 22 for fittingly connecting the main base plate 21 and the sub base plate 22 with each other. The fitting holes 21b and the fitting protrusions 22b are located at an area defined between the attachment holes 21a/22a and an upper side portion of the main base plate 21/the sub base plate 22 (serving as one side portion of the first and second plates opposite to another side portion at which first and second plate groove portions are formed). The fitting holes 21b of the main base plate 21 and the fitting protrusions 22b of the sub base plate 22 serve as a plurality of connecting portions. According to the embodiment, two fitting holes 21b are formed at upper portions of the left and right side portions of the main base plate 21, respectively, while two fitting protrusions 22b are formed at upper portions of the left and right side portions of the sub base plate 22 at positions respectively corresponding to the fitting holes 21b. The attachment holes 21a and 22b, the fitting holes 21b and the fitting protrusions 22b will be described below in more detail.

Still further, as illustrated in FIG. 3B, a flange portion (serving as a first flange portion) 211 is formed at the upper side portion of the main base plate 21 (i.e., at the one side portion of the first and second plates). More specifically, the flange portion 211 extends from an upper side portion of the bent portion 212 of the main base plate 21 and then is bent towards the sub base plate 22 so as to have an L-shaped cross section when seen from a lateral side of the lock apparatus. The flange portion 211 extends from predetermined positions P, which are respectively provided at the upper side portion of the main base plate 21 (i.e., at the one side portion of the first and second plates) and defined at positions further inward from left and right upper corner portions 212a of the bent portion 212 by a predetermined distance. On the other hand, as illustrated in FIG. 3B, a flange portion (serving as a second flange portion) 221 is formed at an upper side portion of the sub base plate 22. More specifically, the flange portion 221 of the sub base plate 22 includes a first bent portion extending in a direction to be away from the main base plate 21 and a second bent portion extending upwardly, i.e., in a direction being parallel with the sub base plate 22, from an end portion of the first bent portion. Thus, the flange portion 221 is bent upwardly so as to have an L-shape when seen from the lateral side of the lock apparatus 1. A width of the second bent portion (upwardly bent portion) of the flange portion 221 is arranged to be approximately same as a width of an upwardly extending portion of the flange portion 211, and an end of the flange portion 221 (an end of the upwardly bent portion of the flange portion 221) and an end of the flange portion 211 are arranged to face each other. Thus, a secondary space is defined between the flange portion 211, which extends from the upper side portion of the bent portion 212 of the main base plate 21, and the flange portion 221, which extends from the upper side portion of the sub base plate 22. The tension spring 27 connected to the hook 25 and the pawl 26 is covered with the flange portion 211 and the flange portion 221 by being housed in the secondary space. Thus, the hook 25, the pawl 26 and the tension spring 27 are protected so as not to interfere with peripheral members provided around the lock apparatus 1.

A main base plate groove portion (serving as the first plate groove portion) 213 is formed at a lower side portion of the main base plate 21 (serving as another side portion at which the first plate groove portion is formed). More specifically, the main base plate groove portion (hereinafter, referred to as a main groove portion) 213 extends upwardly from the approximately central portion of the lower side portion of the main base plate 21. The striker 23 is configured to be engaged with (inserted into) the main groove portion 213. When the striker 23 is engaged with (inserted into) the main groove portion 213 of the main base plate 21, the striker 23 makes contact with an inner end wall 213a of the main groove portion 213. On the other hand, a sub base plate groove portion (serving as a second plate groove portion) 223 is formed at a lower side portion of the sub base plate 22 (serving as another side portion at which the second plate groove portion is formed) so that the sub groove portion 223 and the main groove portion 213 substantially match each other when the main base plate 21 and the sub base plate 22 are arranged to overlap each other. More specifically, the sub base plate groove portion (hereinafter, referred to as sub groove portion) 223 extends upwardly from the approximately central portion of the lower side portion of the sub base plate 22. The striker 23 is configured to be engaged with (inserted into) the sub groove portion 223 and to make contact with an inner end wall 223a of the sub groove portion 223. The locked state of the lock apparatus 1 is illustrated in FIGS. 2 and 3, in which an illustration of the striker 23 is omitted.

The hook 25 is made from a plate member. The hook 25 is provided in a space defined between the bent portion 212 of the main base plate 21 and the approximately central portion of the sub base plate 22 and is located at a slightly right side of the main groove portion 213 (the sub groove portion 223). A pivot shaft (serving as a hook pivot shaft) 28 is provided at an approximately central portion of the hook 25. The hook 25 is pivotably supported by the main base plate 21 and the sub base plate 22 via the pivot shaft 28. A hook groove portion 251 is formed at a lower left side surface portion of the hook 25. The striker 23 is configured to be engaged with (inserted into) the hook groove portion 251. On the other hand, a pawl engagement surface (serving as a first engagement surface) 253 and a pawl sliding surface (serving as a second engagement surface) 254 are formed at an upper left side surface portion of the hook 25. A hook engagement surface 261 formed at the pawl 26 (described below in detail) is configured to be engageable with and disengageable from the pawl engagement surface 253 of the hook 25 and to be slidable on the pawl sliding surface 254 of the hook 25. Further, a pin 255 protrudes from an upper portion of one surface of the hook 25 in a thickness direction of the hook 25. One end portion of the tension spring 27 is locked to the pin 255. The hook 25 pivotally moves, about the pivot shaft 28, between a lock release position, at which the striker 23 is fully released from the hook groove portion 251, and a lock position, at which the striker 23 is engaged with (inserted into) the hook groove portion 251 and is locked so as not to be released therefrom.

The pawl 26 is disposed at a left side relative to the main groove portion 213 (the sub groove portion 223) in the space defined between the bent portion 212 of the main base plate 21 and the approximately central portion of the sub base plate 22. A pivot shaft (serving as a pawl pivot shaft) 29 is provided at a lower portion of the pawl 26. The pawl 26 is supported by the main base plate 21 and the sub base plate 22 via the pivot shaft 29. The hook engagement surface 261 is formed at an approximately central portion of a right side surface of the pawl 26. As described above, the hook engagement surface 261 of the pawl 26 is configured to engage with the pawl engagement surface 253 formed at the hook 25. Further, a pin 262 protrudes from an upper portion of one surface of the pawl 26 in a thickness direction of the pawl 26. Another end portion of the tension spring 27 is locked to the pin 262, and the lever 24 is pivotably supported by the pin 262. When the hook 25 is located in the lock position, the hook engagement surface 261 of the pawl 26 engages with the pawl engagement surface 253 of the hook 25 so as to prevent the hook 25 from pivotally moving from the lock position towards the lock release position. An engagement point between the hook engagement surface 261 of the pawl 26 and the pawl engagement surface 253 of the hook 25 is disposed at a position further upwardly than a line connecting the pivot shaft 28 provided at the hook 25 and the pivot shaft 29 provided at the pawl 26. Accordingly, the pivotal movement of the hook 25 from the lock position towards the lock release position is restrained.

Figure 4:
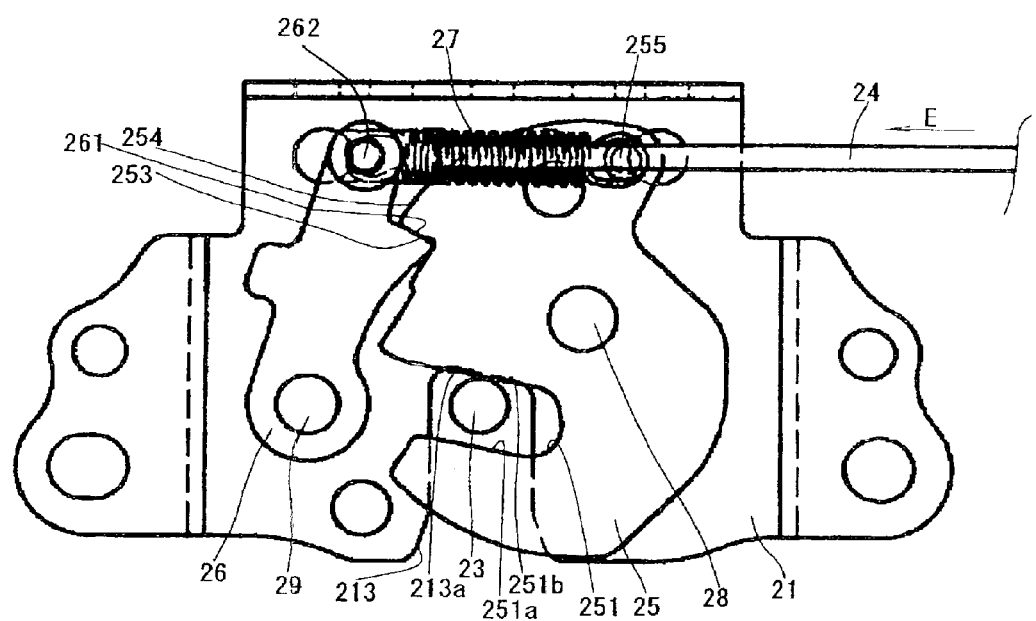
FIG. 4 is a plane view, in which an illustration of a sub base plate of the lock apparatus is omitted, schematically illustrating a locked state of the lock apparatus.
Figure 5:
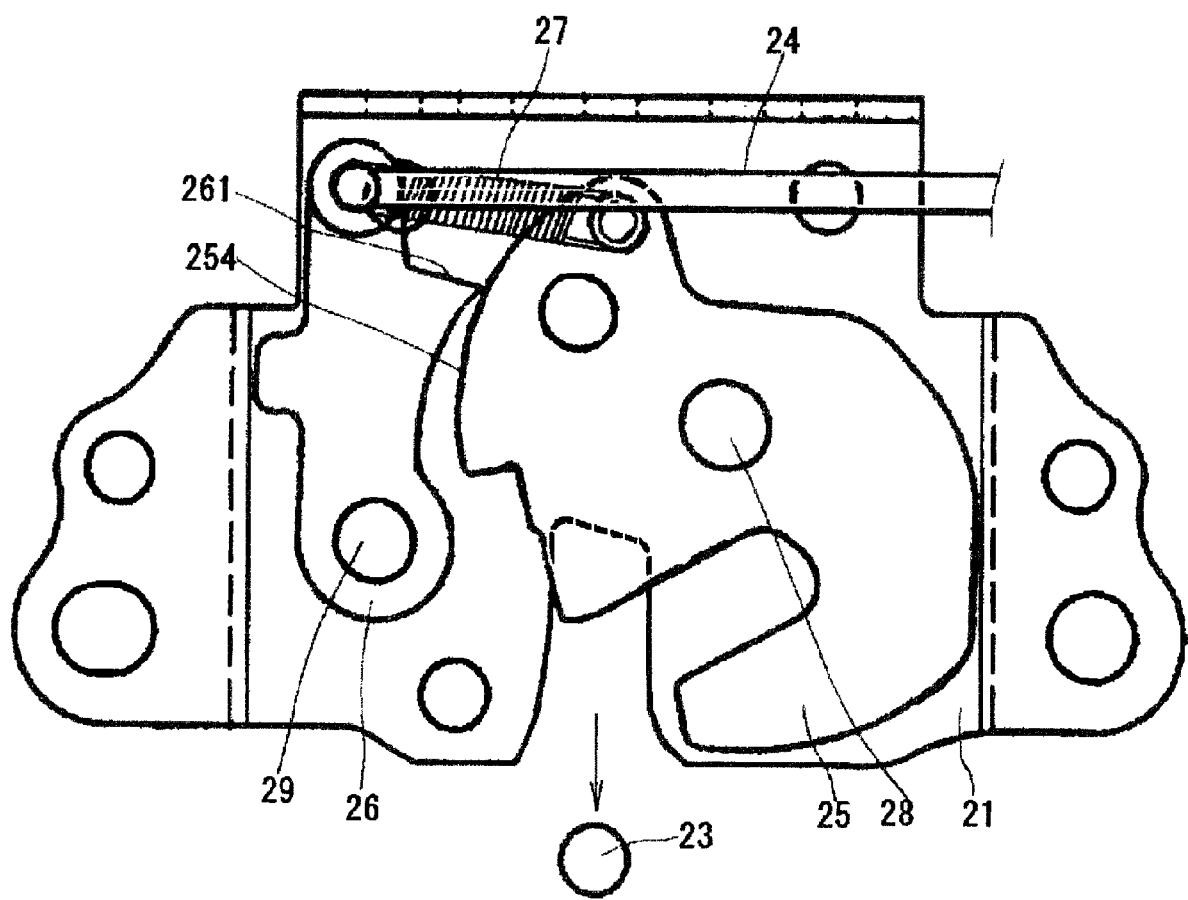
FIG. 5 is a plane view, in which the illustration of the sub base plate is omitted, schematically illustrating a lock released state of the lock apparatus.

Next, an operation of the lock apparatus 1 will be described hereinbelow with reference to FIGS. 4 and 5. In FIGS. 4 and 5, an illustration of the sub base plate 22 is omitted. First, a manner for operating the lock apparatus 1 from the locked state to the lock released state will be described. First, as illustrated in FIG. 4, the lever 24 is pressed in a direction indicated with an arrow E in the locked state where the striker 23 is disposed between the inner end wall 213a of the main groove portion 213 of the main base plate 21 (inner end wall 223a of the sub groove portion 223 of the sub base plate 22) and a lower side surface 251a of the hook groove portion 251 of the hook 25. As described above, because one end portion of the lever 24 is pivotably supported by the pin 262 of the pawl 26, the pawl 26 pivotally moves in a counterclockwise direction in FIG. 4 about the pivot shaft 29 provided at the pawl 26. Then, the hook engagement surface 261 engaged with the pawl engagement surface 253 is released therefrom and then makes contact with the pawl sliding surface 254 of the hook 25 beyond the pawl engagement surface 253. Further, the hook 25 pivotally moves in the counterclockwise direction in FIG. 4 by a tensile force of the tension spring 27. At the same time, the hook engagement surface 261 of the pawl 26 slidably moves on the pawl sliding surface 254 of the hook 25, and the pawl 26 accordingly pivotally moves in the counterclockwise direction in FIG. 4 about the pivot shaft 29. Accordingly, the hook 25 pivotally moves to the lock release position as illustrated in FIG. 5, and the striker 23 is released from the main groove portion 213 formed at the main base plate 21.

Next, a manner for operating the lock apparatus 1 from the lock released state to the locked state will be described hereinbelow. The striker 23 inserted into the main groove portion 213 (the sub groove portion 223) from the opening portion thereof makes contact with an upper side surface 251b of the hook groove portion 251 and presses the hook 25. The striker 23 relatively moves within the main groove portion 213 (the sub groove portion 223) to approach the inner end wall 213a of the main groove portion 213 (the inner end wall 223a of the sub groove portion 223), and the hook 25 is accordingly pressed to pivot in a clockwise direction in FIG. 5 by the striker 23. At this time, the pawl 26 is operated to pivot in the clockwise direction along with the hook 25 by the tensile force of the tension spring 27. Accordingly, the hook engagement surface 261 of the pawl 26 slidably moves along the pawl sliding surface 254 of the hook 25 and is then engaged with the pawl engagement surface 253 of the hook 25. Therefore, the hook 25 is operated to pivotally move to the lock position thereof illustrated in FIG. 4, and the striker 23 is disposed between the inner end wall 213a of the main groove portion 213 of the main base plate 21 (the inner end wall 223a of the sub groove portion 223 of the sub base plate 22) and a lower side surface 251a of the hook groove portion 251 of the hook 25.

Figure 6:
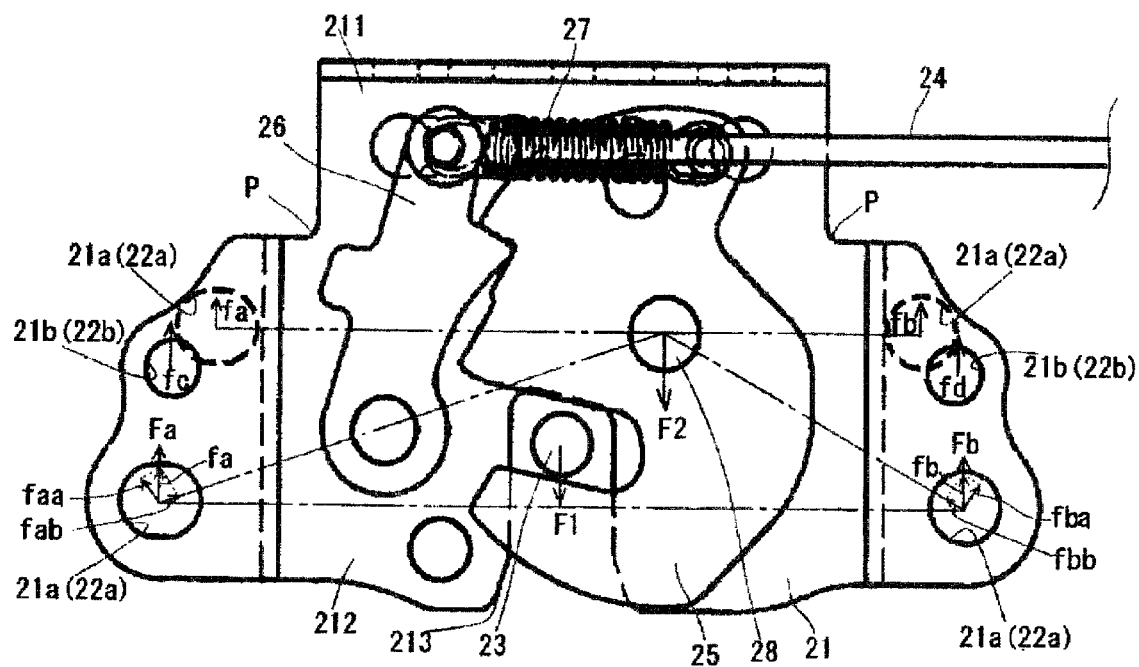
FIG. 6 is an explanatory plane view, in which the illustration of the sub base plate is omitted illustrating a force application manner where an external force is applied to a striker of the lock apparatus in the locked state thereof.

Herein, structures and operations of the main base plate 21, the sub base plate 22, the attachment holes 21a and 22a, the fitting holes 21b and of the fitting protrusions 22b will be described with reference to FIG. 6. In FIG. 6, although an illustration of the sub base plate 22 is omitted, the structure and the operation of the sub base plate 22 are also indicated in the description hereinbelow. As described above, the bent portion 212 is formed at the approximately central portion of the main base plate 21. Further, the flange portion 211 extends upwardly from the predetermined positions P, which are respectively provided at the upper side portion of the main base plate 21 (i.e., at the one side portion of the first and second plates) and defined at the positions further inward from left and right upper corner portions 212a of the bent portion 212 by a predetermined distance. A cross sectional shape (area) of the main base plate 21 is changed from the predetermined positions P. In other words, shape-changing positions are provided between the bent portion 212 and the flange portion 211 of the main plate 21. Hereinafter, the predetermined positions P will accordingly be referred to as shape-changing portions P. On the other hand, the flange portion 221 is formed by bending an entire upper side portion of the sub base plate 22 which is made from a plane plate. So configured, the rigidity of the main base plate 21 is lower than the rigidity of the sub base plate 22 because of the bent portion 212.

The attachment holes 21a (according to the embodiment, two attachment holes 21a) are respectively formed at the right and left lower portions of the main base plate 21, while the attachment holes 22a (according to the embodiment, two attachment holes 22a) are respectively formed at the right and left lower portions of the sub base plate 22. The attachment holes 21a and the corresponding attachment holes 22a function as plural fixing portions for fixedly connecting the main base plate 21 and the sub base plate 22 to the seatback 11. Further, the fitting holes 21b (according to the embodiment, two fitting holes 21b, for example) are respectively formed at the left and right upper portions of the main base plate 21, while the fitting protrusions 22b (according to the embodiment, two fitting protrusions 22b, for example), are respectively formed at left and right upper portions of the sub base plate 22. The fitting protrusions 22b fit into the fitting holes 21b, respectively. Thus, the fitting holes 21b and the corresponding fitting protrusions 22b function as the plural connecting portions provided at the main base plate 21 and the sub base plate 22 for connecting the main base plate 21 and the sub base plate 22. More specifically, the right attachment holes 21a and 22a are formed to assemble attachment bolts thereinto, i.e., a diameter of the attachment holes 21a and 22a are formed to be slightly larger than a diameter of the corresponding attachment bolts, for example, while the left attachment holes 21a and 22a are formed to adjust a position of attachment bolts inserted thereinto, i.e., the attachment holes 21a and 22a are formed in an oval shape so that a lateral length thereof is arranged to be slightly larger than a diameter of the corresponding attachment bolts, for example. As illustrated in FIG. 6, when the left and right attachment holes 21a (the left and right attachment holes 22a) and the pivot shaft 28 of the hook 25 provided at the approximately central portion of the main base plate 21 (the sub base plate 22) are connected by an imaginary line, the left and right attachment holes 21a (the left and right attachment holes 22a) and the pivot shaft 28 are disposed at three apexes of a triangle, respectively.

A diameter of each of the fitting holes 21b, which are defined (pierced) at the main base plate 21, and a diameter of each of the fitting protrusions 22b, are arranged so that each of the fitting protrusions 22b is fittingly inserted into the corresponding fitting hole 21b. Herein, the pivot shaft 28 of the hook 25 is disposed at the approximately central portion of the main base plate 21 and the sub base plate 22, i.e., at an area defined between the left and right attachment holes 21a/22a and between the main groove portion 213/the sub groove portion 223 and the upper side portion of the main base plate 21/the sub base plate 22 (serving as the one side portion of the first and second plates opposite to another side portion at which the first and second plate groove portions are formed). The left and right fitting holes 21b/the fitting protrusions 22b are arranged to be disposed on or disposed adjacent to an imaginary line which extends in the lateral direction of the main base plate 21/the sub base plate 22 (i.e., in a direction orthogonal to a releasing direction to release the striker 23 engaged with the main groove portion 213/the sub groove portion 223) through the pivot shaft 28 of the hook 25. The attachment holes 21a and 22a are provided at the main base plate 21 and the sub base plate 22 for fixedly connecting the main base plate 21 and the sub base plate 22 to the side surface of the seatback 11, while the fitting holes 21b and the fitting protrusions 22b are provided for connecting the main base plate 21 and the sub base plate 22 thereby balancing a load applied to the main base plate 21 and the sub base plate 22. In other words, the fitting holes 21b and the fitting protrusions 22b are formed at the main base plate 21 and the sub base plate 22, respectively, for reinforcing the main base plate 21, of which rigidity is lower, by the sub base plate 22, of which rigidity is higher.

Hereinafter, a condition where an external force F1, which acts in the releasing direction (i.e., in a direction towards an opening portion of the main groove portion 213 of the main base plate 21) of the striker 23, is applied to the striker 23 and a reacting force F2 is generated at the pivot shaft 28 of the hook 25 in the locked state of the lock apparatus 1, will be described. Herein, in a condition where fitting holes (such as the fitting holes 21b) and fitting protrusions (such as the fitting protrusions 22b) are not formed at the main base plate 21 and the sub base plate 22, reacting forces Fa and Fb are generated at the left and right attachment holes 21a/22a of the main base plate 21/sub base plate 22 fixedly connected to the side surface of the seatback 11 via the attachment bolts. The shape-changing portions P of the bent portion 212 of the main base plate 21 are positioned at the upper portion of the bent portion 212 of the main base plate 21, i.e., at a position further upward than the left and right attachment holes 21a, 22a and the pivot shaft 28 of the hook 25. Accordingly, when the reacting forces Fa and Fb are respectively generated at the attachment holes 21a/22a of the main base plate 21/the sub base plate 22, the main base plate 21 and the sub base plate 22 are forced to strain (deform) in a direction where opening portions of the main groove portion 213 and the sub groove portion 223 expand. Accordingly, stress force (reacting force) is intensively generated at the shape-changing portions P of the bent portion 212 of the main base plate 21, and the main base plate 21 may accordingly be deformed and/or damaged.

However, according to the embodiment, the fitting holes 21b and the fitting protrusions 22b, which fit with each other, are formed between the shape-changing portions P of the bent portion 212 and the attachment holes 21a and 22a. More specifically, the fitting holes 21b and the fitting protrusions 22b are formed in the vicinity of the shape-changing portions P as far as possible so as to reduce a deformation of the main base plate 21 and/or the sub base plate 22 and/or to reduce a relative displacement between the main base plate 21 and the sub base plate 22. Accordingly, the reacting forces Fa and Fb generated at the left and right attachment holes 21a/22a are dispersed to the fitting holes 21b and the fitting protrusions 22b. In such a condition, reacting forces fc and fd are generated at the left and right fitting holes 21b/22b, respectively. As a consequence, reacting forces fa and fb, which are respectively derived by subtracting the reacting forces fc and fd from the reacting forces Fa and Fb, are generated at the left and right attachment holes 21a/22a.

Further, the left and right attachment holes 21a/22a of the main base plate 21/the sub base plate 22 are disposed at left and right sides of the main groove portion 213/the sub groove portion 223 of the main base plate 21/the sub base plate 22, respectively, and are aligned in a direction orthogonal to the releasing direction of the striker 23 in which the striker engaged with the main groove portion 213/the sub groove portion 223 relatively downwardly moves to be released therefrom. The pivot shaft 28 of the hook 25 is disposed at an upper area of the main groove portion 213/the sub groove portion 223 between the left and right attachment holes 21a/22a, i.e., at the area defined between the left and right attachment holes 21a/22a and between the main groove portion 213/the sub groove portion 223 and the upper side portion of the main base plate 21/the sub base plate 22. Herein, in a condition where the left and right attachment holes 21a/22a are formed on the line extending in the left and right direction of the main base plate 21/the sub base plate 2 through the pivot shaft 28 as illustrated in FIG. 6 with dashed lines, i.e., in a condition where the left and right attachment holes 21a/22a and the pivot shaft 28 of the hook 25 are aligned in the left and right direction of the main base plate 21/the sub base plate 22, the reacting forces fa and fb generated at the left and right attachment holes 21a/22a are entirely applied to the pivot shaft 28 as a moment, thus leading to the strain of the main base plate 21. However, according to the embodiment, the left and right attachment holes 21a/22a and the pivot shaft 28 of the hook 25 are disposed on the imaginary triangular line, i.e., the pivot shaft 28 of the hook 25 is located off a connecting line connecting the left and right attachment holes 21a/22a. Accordingly, a part of the reacting forces fa and fb generated at the left and right attachment holes 21a/22a functions as compressed reacting forces (component forces respectively acting in a direction of lines connecting the pivot shaft 28 of the hook 25 and the left and right attachment holes 21a/22a) fab and fbb, respectively, and the rest of the reacting forces fa and fb function as reacting forces (component forces acting in a direction orthogonal to the lines respectively connecting the pivot shaft 28 and the left and right attachment holes 21a/22a) faa and fba which act as a moment relative to the pivot shaft 28 and which relate to the strain of the main base plate 21. Thus, the reacting force relating to the strain of the main base plate 21 is reduced to be lower than the reacting forces fa and fb. Accordingly, specifically the strain of the main base plate 21, i.e., a strain to deform the main base plate 21 in a direction to expand the opening portion of the main groove portion 213, is reduced. As a consequence, the stress force is largely restrained from being intensively applied to the deforming points P of the bent portion 212 of the main base plate 21, thereby preventing the main base plate 21 from deforming and/or being damaged.

According to the embodiment, the left and right fitting holes 21b/the fitting protrusions 21b are disposed on the imaginary line which extends in the lateral direction of the main base plate 21/the sub base plate 22 through the pivot shaft 28 of the hook 25. Alternatively, the left and right fitting holes 21b/the fitting protrusions 22b may be provided at positions further upward than the imaginary line extending in the lateral direction of the main base plate 21/the sub base plate 22 through the pivot shaft 28 of the hook 25 so that the stress force generated at each of the shape-changing portions P is effectively reduced by the fitting holes 21b and the fitting protrusions 22b. Further according to the embodiment, two attachment holes 21a/22a and two fitting holes 21b/fitting protrusions 22b are formed on the main base plate 21/the sub base plate 22. However, more than two attachment holes 21a/22a and fitting holes 21b/fitting protrusions 22b may be formed on the main base plate 21/the sub base plate 22. Further, although the fitting holes 21b are formed at the main base plate 21 while the fitting protrusions 22b are formed at the sub base plate 22 according to the embodiment, fitting protrusions may be formed at the main base plate 21 and fitting holes may be formed at the sub base plate 22. Still further, according to the embodiment, the lock apparatus 1 is adapted to fixedly connect the seatback 11 of the seat 10 (reclining seat) to the side surface of the vehicle compartment. However, the lock apparatus 1 is applicable to connect a detachable seat to a vehicle floor, for example. Still further, a torsion coil spring acting in the counterclockwise direction relative to the pivot shaft 28 of the hook 25 and a torsion coil spring acting in the clockwise direction of the pivot shaft 29 of the pawl 26 may be provided in place of the torsion spring 27.

As described above, in the condition where the external force is applied to the striker 23 engaged with the hook groove portion 251 of the hook 25 located at the lock position, the reacting force is generated at the fixing portions (the attachment holes 21a and the attachment holes 22a) of the main base plate (first plate) 21 and the sub base plate (second plate) 22. However, since the plural connecting portions (the fitting holes 21b and the fitting protrusions 22b), i.e., at least two connecting portions, at which the main base plate 21 and the sub base plate 22 are fittingly connected with each other, are formed at the main base plate 21 and the sub base plate 22, the reacting forces generated at the fixing portions (the attachment holes 21a and 22a) are dispersed to the connecting portions (the fitting holes 21b and the fitting protrusions 22b). Accordingly, particularly a strain to be generated at the main base plate 12, i.e., a strain to deform the main base plate 21 in the direction to expand the opening portion of the main groove portion 213, is suppressed. Therefore, the stress force (reacting force) is restrained from intensively generated at the one side portion (upper portion) of the main base plate 21 (and the sub base plate 22), which is opposite to another side portion at which the main groove portion 213 (and the sub groove portion 223) is formed. Accordingly, the main base plate 21 (and the sub base plate 22) is prevented from deforming and/or being damaged.

Further according to the embodiment, two attachment holes 21a and two attachment holes 22a (first and second fixing portions) are formed at the main base plate 21 and the sub base plate 22. The two attachment holes 21a are disposed at first and second sides (left and right sides) of the main groove portion 213 of the main base plate 21 with a distance apart from each other in the direction orthogonal to the releasing direction of the striker 23 in which the striker 23 engaged with the main groove portion 213 is moved relative thereto to be released therefrom. In the same manner, the two attachment holes 22a are disposed at first and second sides (left and right sides) of the sub groove portion 223 of the sub base plate 22 with a distance apart from each other in the direction orthogonal to the releasing direction of the striker 23. The pivot shaft 28 of the hook 25 is disposed at the area defined between the attachment holes 21a/22a and between the main groove portion 213/the sub groove portion 223 and the one side portion (upper side portion) of the main base plate 21/the sub base plate 22. The pivot shaft 28 is located off the connecting line connecting the attachment holes 21a/22a.

Due to the above described structure, the pivot shaft (hook pivot shaft) 28 is provided at the position located off the connecting line connecting the attachment holes 21a/22a of the main base plate 21/the sub base plate 22. More specifically, the left and right attachment holes 21a/22a are respectively disposed at the left and right sides of the main groove portion 213/the sub groove portion 223 with a predetermined distance apart from each other in the direction orthogonal to the releasing direction of the striker 23, and the pivot shaft 28 of the hook 25 is provided at the area defined between the left and right attachment holes 21a/22a and between the main groove portion 213/the sub groove portion 223 and the upper side portion of the main base plate 21/the sub base plate 22. So configured, in the condition where the striker 23 engaged with the hook groove portion 251 located at the lock position receives the external force acting in the releasing direction of the striker 23, the reacting force, which is to be generated at the attachment holes 21a/22a through the pivot shaft 28 of the hook 25 for straining the main base plate 21 (and the sub base plate 22), is reduced to be lower than a stress force generated in a structure where the pivot shaft 28 of the hook 25 and the left and right attachment holes 21a/22a are disposed on the same line, for example. Due to the structure where the pivot shaft 28 of the hook 25 is provided at the position located off the connecting line connecting the attachment holes 21a/22a, the stress force to be generated at the fixing portions (the attachment holes 21a/22a) are dispersed to the connecting portions (fitting holes 21b and the fitting protrusions 22b) of the main base plate 21 and the sub base plate 22. Accordingly, particularly the strain of the main base plate, i.e., the strain to deform the main base plate 21 in the direction to expand the opening portion of the main groove portion 213, is largely reduced. Therefore, the stress force (reacting force) is restrained from intensively generated at the one side portion (upper portion) of the main base plate 21 (and the sub base plate 22), which is opposite to another side portion at which the main groove portion 213 (and the sub groove portion 223) is formed. Accordingly, the main base plate 21 (and the sub base plate 22) is prevented from deforming and/or being damaged.

Still further according to the embodiment, the attachment holes 21a (first attachment holes), which are formed through the main base plate 21, and the attachment holes 22a (second attachment holes), which are formed through the sub base plate 22 at positions respectively corresponding to the attachment holes 21a, structure the plural fixing portions.

Still further, the diameter of one of the attachment holes 21a is larger than a diameter of another of the attachment holes 21a. In the same manner, a diameter of one of the attachment holes 22a is larger than a diameter of another of the attachment holes 22a.

Still further, the fitting holes 21b, which are formed through the main base plate 21, and the fitting protrusions 22b, which are formed at the sub base plate 22 at positions respectively corresponding to the fitting holes 21b, structure the connecting portions. The fitting protrusions 22b are arranged to fit into the fitting holes 21b, respectively. The main base plate 21 and the sub base plate 22 are accordingly connected with each other.

Still further according to the embodiment, the flange portion 211 extends from the bent portion 212 of the main base plate 21 towards the sub base plate 22. The tension spring (biasing member) 27 is covered with the flange portion 211 of the main base plate 21 and the sub base plate 22.

More specifically, the sub base plate 22 includes the flange portion 221. The flange portion 221 includes the first bent portion extending in the direction to be away from the main base plate 21 and the second bent portion extending from the end portion of the first bent portion in the direction parallel with the sub base plate 22. The tension spring 27 is covered with the flange portion 211 of the main base plate 21 and the flange portion 221 of the sub base plate 22.

Still further according to the embodiment, the bent portion 212 is formed at the central portion of the main base plate 21. The flange portion 211 extends from the bent portion 212 at the one side portion of the main base plate 21/the sub base plate 22. Accordingly, the shape-changing portion P, at which the cross sectional shape (area) of the first plate is changed, is provided at the one side portion of the main base plate 21/the sub base plate 22 between the bent portion 212 and the flange portion 211.

According to the embodiment, even with the structure where the bent portion 212 is formed at the main base plate 21 and the bent portion 212 includes the shape-changing portion(s) P at which the cross sectional shape (area) of the main base plate 21 is changed, the stress force is prevented from being intensively generated at such shape-changing portion P, thereby preventing the main base plate 21 from deforming and/or being damaged.

Still further, the movable member includes the seatback portion 11 of the seat 10, and the fixture member includes the side surface of the vehicle compartment. Still further, the striker 23 is fixedly connected to the seatback portion 11 (fixture member).

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A lock apparatus of a seat for a vehicle, comprising:

a striker adapted to be fixedly connected to one of a fixture member and a movable member;

a first plate adapted to be fixedly connected to the other of the fixture member and the movable member, the first plate including a bent portion and a first plate groove portion with and from which the striker is engageable and releasable;

a second plate provided to overlap the first plate with a space from the bent portion of the first plate and adapted to be fixedly connected to the other of the fixture member and the movable member, the second plate including a second plate groove portion with and from which the striker is engageable and releasable, the second plate groove portion of the second plate being provided at a position corresponding to the first plate groove portion of the first plate;

a plurality of fixing portions provided at the first and second plates for fixedly connecting the first and second plates to the other of the fixture member and the movable member;

a hook member provided in the space defined between the first plate and the second plate and pivotably supported by the first and second plates via a hook pivot shaft, the hook member including a hook groove portion with which the striker is engageable when the striker is engaged with the first and second plate groove portions and from which the striker is releasable when the striker is to be released from the first and second plate groove portions, the hook member being pivotable between a lock release position, at which the striker is fully released from the hook groove portion, and a lock position, at which the striker is engaged with the hook groove portion and is prevented from being released therefrom;

a pawl member provided in the space defined between the first plate and the second plate and pivotably supported by the first and second plates via a pawl pivot shaft, the pawl member adapted to be engaged with a first engagement surface of the hook member for preventing the hook member from pivotally moving from the lock position towards the lock release position when the hook member is located at the lock position, the pawl member adapted to be released from the first engagement surface of the hook member and to be engaged with a second engagement surface of the hook member for allowing the hook member to pivotally move from the lock position towards the lock release position;

a biasing member provided in the space defined between the first and second plates and biasing the hook member and the pawl member in a direction to engage the hook member and the pawl member; and a plurality of connecting portions provided at the first and second plates for connecting the first and second plates with each other, the plurality of connecting portions located at an area defined between the plurality of fixing portions and one side portion of the first and second plates, the one side portion opposite to another side portion at which the first and second plate groove portions are formed, wherein the plurality of fixing portions includes a first plurality of attachment holes formed through the first plate and a second plurality of attachment holes formed through the second plate at positions respectively corresponding to the first plurality of attachment holes, wherein the first and second plurality of attachment holes are respectively disposed at first and second sides of the first and second plate groove portions with a distance apart from each other in a direction orthogonal to a releasing direction of the striker, the releasing direction in which the striker engaged with the first and second plate groove portions is moved relative to the first and second plate groove portions to be released therefrom, wherein the hook pivot shaft of the hook member is disposed at an area defined between the first and second plurality of attachment holes and between the first and second plate groove portions and the one side portion of the first and second plates, wherein the hook pivot shaft is located off a connecting line connecting the first and second fixing portions, wherein the plurality of connecting portions includes a plurality of fitting holes formed through one of the first and second plates, and a plurality of fitting protrusions formed at the other of the first and second plates at positions respectively corresponding to the plurality of fitting holes, wherein the fitting protrusions are arranged to fit into the fitting holes, respectively, whereby the first and second plates are connected with each other, wherein the plurality of connecting portions are offset from the plurality of fixing portions in a direction parallel to the releasing direction of the striker and away from an opening portion of the first and second groove portions, wherein a center spacing distance of the plurality of fitting holes are closer to the first and second main grooves in the direction orthogonal to the releasing direction of the striker than a center spacing distance of the first and second plurality of attachment holes, and wherein the surface of at least one fitting hole is touching the surface of at least one fitting protrusion.

2. A lock apparatus of a seat for a vehicle according to claim 1, wherein a diameter of one of the first attachment holes is larger than a diameter of another of the first attachment holes, and a diameter of one of the second attachment holes is larger than a diameter of another of the second attachment holes.

3. A lock apparatus of a seat for a vehicle according to claim 1, wherein the movable member includes a seatback portion of the seat for the vehicle, the fixture member includes a side surface of a vehicle compartment, and the striker is fixedly connected to the fixture member.

4. A lock apparatus of a seat for a vehicle according to claim 1, wherein
   a first flange portion extends from the bent portion of the first plate towards the second plate, and
   the biasing member is covered with the first flange portion of the first plate and the second plate.

5. A lock apparatus of a seat for a vehicle according to claim 4, wherein
   the second plate includes a second flange portion,
   the second flange portion includes a first bent portion extending in a direction to be away from the first plate and a second bent portion extending from an end portion of the first bent portion in a direction parallel with the second plate, and
   the biasing member is covered with the first flange portion of the first plate and the second flange portion of the second plate.

6. A lock apparatus of a seat for a vehicle according to claim 4, wherein
   the bent portion is formed at a central portion of the first plate, and
   the first flange portion extends form the bent portion at the one side portion of the first and second plates,
   whereby a shape-changing portion, at which a cross sectional shape of the first plate is changed, is provided between the bent portion and the first flange portion at the one side portion of the first and second plates.

7. A lock apparatus of a seat for a vehicle according to claim 6, wherein the plurality of connecting portions are disposed between the shape-changing portion and the first and second plurality of fixing portions.

* * * * *